(12) United States Patent
Srinivasan et al.

(10) Patent No.: US 10,643,274 B2
(45) Date of Patent: May 5, 2020

(54) METHOD AND APPARATUS FOR PRE-POPULATING DATA FIELDS IN A GRAPHICAL USER INTERFACE

(71) Applicant: Openlane, Inc., Redwood City, CA (US)

(72) Inventors: Revathi Srinivasan, Redwood City, CA (US); Julia Weston Alley, Redwood City, CA (US)

(73) Assignee: Openlane, Inc., Redwood City, CA (US)

( * ) Notice: Subject to any disclaimer, the term of this patent is extended or adjusted under 35 U.S.C. 154(b) by 866 days.

(21) Appl. No.: 15/255,836

(22) Filed: Sep. 2, 2016

(65) Prior Publication Data

US 2018/0068380 A1 Mar. 8, 2018

(51) Int. Cl.
  *G06Q 30/02* (2012.01)
  *G06Q 30/08* (2012.01)
  *G06F 3/0482* (2013.01)
  *G06Q 30/06* (2012.01)

(52) U.S. Cl.
  CPC ........... *G06Q 30/08* (2013.01); *G06F 3/0482* (2013.01); *G06Q 30/0222* (2013.01); *G06Q 30/0235* (2013.01); *G06Q 30/0641* (2013.01)

(58) Field of Classification Search
  CPC .................................................. G06Q 30/02
  See application file for complete search history.

(56) References Cited

U.S. PATENT DOCUMENTS

| | | | |
|---|---|---|---|
| 7,103,904 B1 | 9/2006 | Blackketter et al. | |
| 8,086,488 B2 * | 12/2011 | Liu | G06Q 30/02 705/14.4 |
| 8,521,592 B2 * | 8/2013 | Harika | G06Q 30/02 705/14.55 |
| 2004/0140361 A1 * | 7/2004 | Paul | G06Q 20/341 235/462.45 |
| 2006/0253434 A1 | 11/2006 | Beriker et al. | |
| 2007/0294133 A1 * | 12/2007 | Lasker | G06Q 30/02 709/230 |
| 2012/0284102 A1 * | 11/2012 | Shave | G06O 30/0207 705/14.23 |
| 2013/0041743 A1 * | 2/2013 | Coppinger | G06Q 30/0236 705/14.36 |

(Continued)

FOREIGN PATENT DOCUMENTS

WO  WO 2016/054547 A1  4/2016

OTHER PUBLICATIONS

International Search Report corresponding to PCT/US17/49530 dated Nov. 13, 2017, 2 pages.

(Continued)

*Primary Examiner* — Sun M Li
*Assistant Examiner* — Thuy N Nguyen
(74) *Attorney, Agent, or Firm* — Lempia Summerfield Katz LLC

(57) ABSTRACT

An electronic online marketplace is provided that stores enhancement data corresponding to goods offered through the online marketplace. The electronic online marketplace further receives and analyzes marketplace attributes for determining when to pre-populate the enhancement data corresponding to the offered goods to enhance a user's experience within the electronic online marketplace.

16 Claims, 7 Drawing Sheets

(56) References Cited

U.S. PATENT DOCUMENTS

| | | | |
|---|---|---|---|
| 2014/0188616 A1* | 7/2014 | Badenhop | G06Q 30/0267 |
| | | | 705/14.58 |
| 2014/0195332 A1* | 7/2014 | Grauer | G06Q 30/0243 |
| | | | 705/14.42 |
| 2015/0088665 A1 | 3/2015 | Karlsson | |
| 2016/0063550 A1 | 3/2016 | Caldwell | |

OTHER PUBLICATIONS

Written Opinion of the International Searching Authority corresponding to PCT/US17/49530 dated Nov. 13, 2017, 4 pages.

* cited by examiner

Figure 3

Browse By Promotions: 701

- $100 Incentive per purchase from Wholesale Inc. (98) — 702
- $200 Buy Fee on R M Hollenshead Units for 60 Days (40) — 703
- 30-day Assurance Guarantee (14956) — 704
- Chrysler Capital 50% Trans-Discount on Select Models (41) — 705
- Flat $100 Buy Fee Avis Budget (1802) — 706
- Hyundai-Kia AFC 14 Day Float (286) — 707
- Toyota Financial Services & Lexus Financial Services Transporta...
- Trusted Seller Vehicles with 30-day Assurance (196) — 708

View In Lane Promotions

Figure 7

METHOD AND APPARATUS FOR PRE-POPULATING DATA FIELDS IN A GRAPHICAL USER INTERFACE

BACKGROUND

Communication networks allow users from remote locations to communicate with each other to accomplish tasks with speed, efficiency, and capabilities not previously available. For example, an online community may be created to be accessible by a plurality of users by running on a network server accessible through a communication network. Operational features of the online community may ask users to input data into certain data input fields, where the data input into the data input fields may be referenced by the online community to implement additional features.

DESCRIPTION OF THE FIGURES

FIG. 3 illustrates an exemplary graphical user interface.

FIG. 7 illustrates an exemplary graphical user interface.

DETAILED DESCRIPTION

Figure 1:
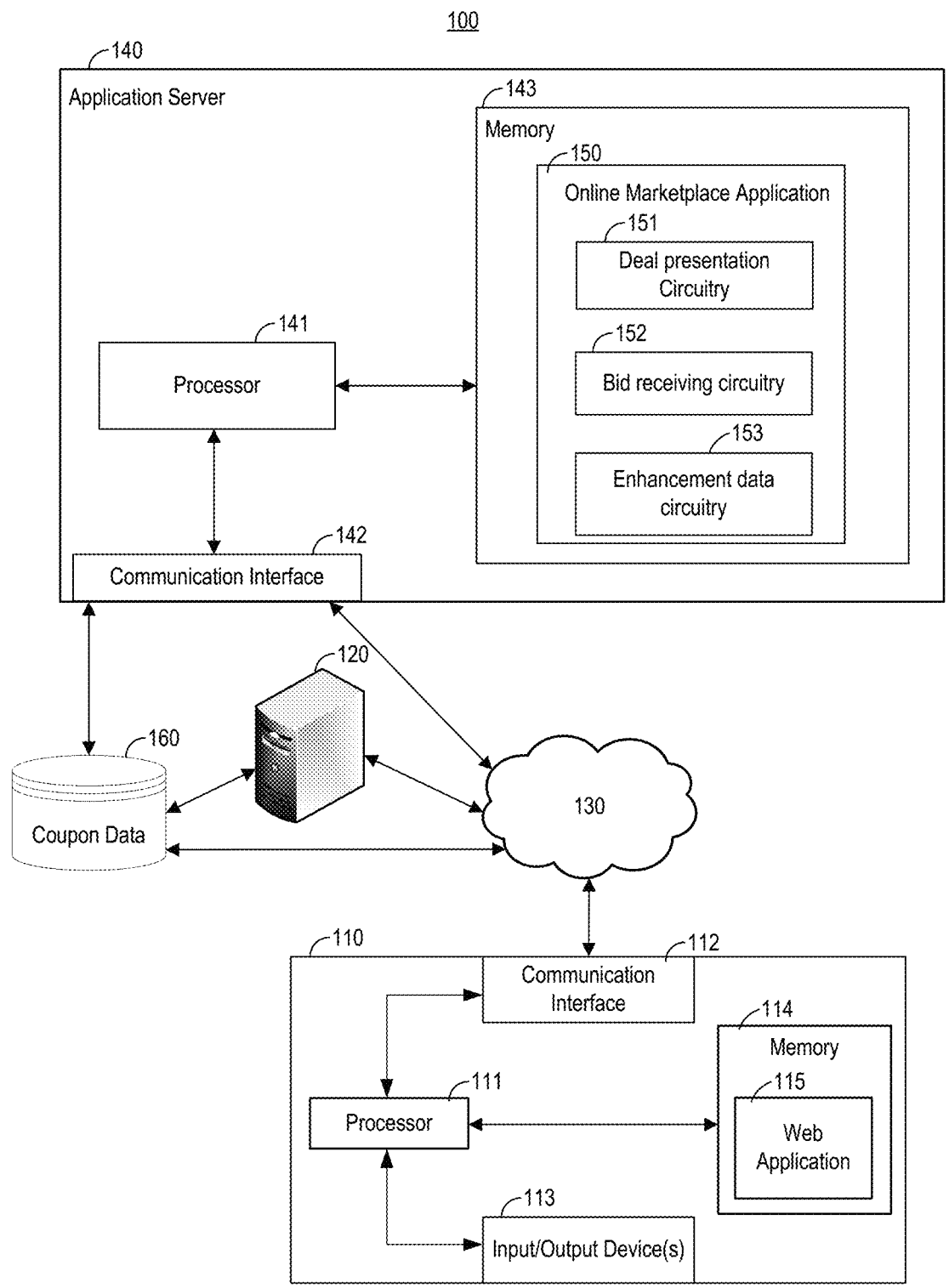
FIG. 1 illustrates an exemplary data retention system.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

Included in the process for utilizing enhancement data within the online marketplace, may be a request to a user to input certain information with the enhancement data. The information being requested may be required to complete transactions within the online marketplace. It follows that the present disclosure describes methods, devices, and systems related to a data retention strategy configured to receive, store, and present certain enhancement data in a pre-populated format to enhance an experience of an online marketplace. For example, the data retention strategy may identify certain enhancement data input into a graphical user interface (GUI) of the online marketplace, and generate a subsequent GUI that is pre-populated to include the certain enhancement data. The subsequent GUI may be a bid receiving interface, and may work to save the user time from re-entering the enhancement data for subsequent use of the online marketplace.

Therefore, the online marketplace of the present disclosure may generate one or more graphical user interfaces (GUIs) that includes one or more data entry fields already pre-populated with data/information obtained from previously inputted data entry fields of previously generated GUIs.

For example, after the enhancement data is input to the online marketplace with a corresponding bid offer on a bid receiving GUI, when the bid offer is not accepted by the online marketplace, the online marketplace may implement the data retention strategy to control a subsequent bid receiving GUI to include at least the same enhancement data. According to some embodiments, the online marketplace may also retain and present one or more additional inputs from the previous bid receiving GUI in addition to the enhancement data when displaying the subsequent bid receiving GUI following an unsuccessful bid. The data retention strategy may be particularly beneficial in cases where the consumer is participating in an auction type of transaction on the online marketplace where timing of bids is important to secure transactions by saving the consumer from manually inputting coupon codes for subsequent bid entries. The data retention strategy may also benefit the consumer by extending the coupon code's valid period to last until an auction period during which the coupon code was first entered ends, even when the coupon code's valid period ends before the auction period.

Allowing access to online marketplaces to users at remote locations offers many benefits for both consumers and merchants. The online marketplace allows users (e.g., consumers and merchants) to exchange electronic information between each other through a communication network to accomplish electronic transactions in a way that is unique to the online marketplace. For example, merchants may offer their goods or services to consumers that may have been physically out of reach without the online marketplace. Consumers may present bids and offers to merchants with an efficiency and speed that were not possible without the online marketplace. In addition, certain enhancement data may be exchanged on the online marketplace during an interaction between users that may affect a transactional decision determined on the online marketplace. The enhancement data may be, for example, a coupon code that identifies certain benefits for a transaction such as a discounted price, reduced fees, or other benefits to a consumer when purchasing a good or service being offered on the online marketplace. The enhancement data may be part of an online promotion presented through the online marketplace, or part of an offline promotion where the coupon code is input into the online marketplace.

According to some embodiments, the data retention strategy for enhancing the experience of an online marketplace may be implemented as part of a web-based application. In particular, given the increasing level of connectivity between users communicating through communication networks, there has been an increased interest and benefit to developing web-based applications. The web-based application is generally understood to be an application stored and configured to operate, at least in part, on a web server accessible to other communication devices connected to a common network. A user operating their communication device may communicate with the web-server through the common network to access and operate the web-based application. Because its framework is stored on one or more web servers, the web-based application allows for accessibility to remote users, other computers, and databases within the network.

Further, the web-based application is configured to generate unique graphical interfaces for presenting information to users on their personal communication devices, where the data processing for creating the information was processed, at least in part, by the off-site web server running the web-based application. This system arrangement frees the user's personal communication device from including the additional computing hardware for processing complex information, as the data processing is accomplished, at least in part, by the off-site server computer. This in turn may allow the user's communication device to be manufactured with less components (may translate to decreasing the physical dimensions of the communication device), and/or components having decreased capabilities (may translate to decreasing cost of manufacturing). Alternatively, the user's personal communication device, freed from generating the unique graphical interfaces, may perform other processing.

To fully utilize the technical advantages of a communication network, a data retention system is disclosed for enhancing a user experience of an online marketplace by retaining certain data for later iterations of an online marketplace feature.

FIG. 1 illustrates an exemplary data retention system 100 (the "system") that includes component devices for implementing the described features. The system 100 includes an application server 140 configured to include the hardware, software, firmware, and/or middleware for operating an online marketplace application 150. Application server 140 is shown to include a processor 141, a memory 143, and a communication interface 142. The online marketplace application 150 is described in terms of an online marketplace for offering vehicles for sale, although the online marketplace application 150 may be representative of other online marketplaces for offering other goods/services.

Online marketplace application 150 may be a representation of software, hardware, firmware, middleware, and/or circuitry configured to implement the data retention features described herein, such as receiving enhancement data, storing enhancement data, determining whether a pre-population criteria is satisfied, and presenting a subsequent GUI with at least the enhancement data pre-populated when the pre-population criteria is determined to be satisfied. For example, the online marketplace application 150 may be a web-based application operating, for example, according to a .NET framework within the system 100. More specifically, the online marketplace application 150 may include deal presentation circuitry 151 (e.g., circuitry for presenting deals by merchants on the online marketplace application 150), bid receiving circuitry 152 (e.g., circuitry for receiving bids from buyers to purchase a deal offered on the online marketplace application 150), and enhancement data circuitry 153 (e.g., circuitry for receiving, storing, and determining when to pre-populate enhancement data). Each of the deal presentation circuitry 151, bid receiving circuitry 152, and enhancement data circuitry 153 may be a representation of software, hardware, firmware, and/or middleware configured to implement respective features of the online marketplace application 150.

The system 100 may further include a database 160 for storing enhancement data describing attributes of enhancement data received by the online marketplace application 150. For example, the enhancement data may include coupons offered by merchants for discounting a purchase or other benefit to a consumer purchasing a good/service on the online marketplace application 150. FIG. 7 illustrates an exemplary graphical user interface (GUI) 700 that depicts a plurality of exemplary coupons that may be offered by a merchant offering a vehicle for sale on the online marketplace application 150. The exemplary coupons includes a first coupon 701, a second coupon 702, a third coupon 703, a fourth coupon 704, a fifth coupon 705, a sixth coupon 706, a seventh coupon 707, and an eighth coupon 708, each describing a promotion offered by a merchant on the online marketplace application 150. A coupon may be offered for one or more vehicles offered for sale by the merchant. Further, one or more coupons may be offered for any one vehicle offered for sale by the merchant.

When the enhancement data represents a coupon for discounting a purchase or other benefit to a consumer purchasing a good/service on the online marketplace application 150, the database 160 may include a table that maps enhancement data (hereinafter may be referred to as the "coupon") received from merchants to their corresponding attributes describing the promotional offer of the respective enhancement data. For example, the corresponding attribute may describe a specific benefit offered by the coupon, a coupon valid period that identifies a time period the coupon remains valid for redemption, specific users that may redeem the coupon, and/or specific goods/services that the coupon may be redeemed for. The application server 140 may communicate with the database 160 directly to access the enhancement data information. The application server 140 may also communicate with the database 160 through a merchant server 120 via network 130 (e.g., the Internet), where the merchant server 120 is in communication with the database 160. The merchant server 120 may be controlled by a merchant associated with offering goods/services on the online marketplace application 150. The merchant may input coupon information, including the defining coupon attributes, on the merchant server 120, and control the merchant server 120 to upload the coupon information onto the database 160 so that the online marketplace application 150 may access the coupon information from the database 160. In addition or alternatively, the coupon information may be uploaded to the database 160 through other processes.

The coupon attributes may include, for example, a coupon valid period that defines a start and end time during which the coupon may be redeemed by a corresponding coupon code, transaction types (e.g., bid, if bid, proxy bid) for which a coupon may be redeemed, specific goods/services groups for which the coupon may be redeemed (e.g., specific vehicle groups such as private label vehicles, car groups, YMM vehicles, seller agent vehicles, vehicles groups identified by vehicle identification numbers, or other types of identification set by a consigner of the vehicle), merchant information for which the coupon may be redeemed (e.g., car dealers on whose vehicles the coupon may be redeemed), sales types for which the coupon may be redeemed (e.g., coupon may be identified as applying to credit card purchases, cash purchases, check purchases, wire transfer purchases, direct bank transfer purchases, or other types of payment methods), identification of the benefit applied by the redemption of the coupon (e.g., purchase price monetary amount discount, purchase price percentage discount, purchase price monetary or percentage discount with a max discount amount or max discount percentage), coupon application information (e.g., coupon applies to total purchase sales price, fee discount such as a buy fee discount, PDI fee discount, assurance fee discount, BBG fee discount, payment processing fee discount), accounting information that identifies an entity that will be paying for the benefit identified by the coupon (e.g., percentage or monetary split between merchant/seller, operator of the online marketplace application, Third Party, and/or a vehicle inspection company).

The coupon attribute information may also identify a coupon type. For example, a coupon may be identified as a standalone coupon, a hidden coupon, or a visible coupon. A standalone coupon may describe a coupon that is neither attached to a promotion nor visible on the online marketplace application 150. For example, the standalone coupon may have been obtained offline. A hidden coupon may have been created by the online marketplace application as part of an incentive, sales event, or existing promotion. The promotion may be searchable but a coupon code of the hidden coupon will remain hidden unless the coupon code is included as part of the promotion title or other details. A visible coupon may have been created by the online marketplace application as part of an incentive, sales event, or existing promotion.

The coupon, promotion, and/or coupon code may be searchable after they are stored in the database 160. For example, the online marketplace application 150 may include a search field that receives a search query, where the online marketplace application 150 then accesses the database 160 and parses the database 160 for the coupon, promotion, and/or coupon code identified in the promotion search query in response to the receiving the search query. The GUI 700 may be a representation of a search query result that presents coupons 701-708 as a result to a search query for coupons offered by merchants through the online marketplace application 150.

The application server 140 may communicate with any number and type of communication devices via network 130. The communication device 110 shown in FIG. 1 may include well known computing systems, environments, and/or configurations that may be suitable for implementing features of the online marketplace application 150 such as, but are not limited to, smart phones, tablet computers, personal computers (PCs), server computers, handheld or laptop devices, multiprocessor systems, microprocessor-based systems, network PCs, server computers, minicomputers, mainframe computers, embedded systems, distributed computing environments that include any of the above systems or devices, and the like. FIG. 1 further shows that the communication device 110 includes a processor 111, a memory 114 configured to store the instructions for operating a web application 115 (web application 115 may be a part of the online marketplace application 150 in that the web application 115 communicates with the online marketplace application 150), an input/output devices 113, and a communication interface 112. A user operating the communication device 110 may run the web application 115 to access the online marketplace application 150 running on the application server 140.

A process for determining whether to pre-populate certain information input fields of a GUI presented by the online marketplace application 150 may begin with a presentation of available deals by the deal presentation circuitry 151. The available deals may have been submitted to the online marketplace application 150 from one or more merchant users of the online marketplace application 150. Each deal may include vehicle information, merchant information describing attributes (e.g., name, address, email, phone number, car manufacturer affiliation) of the merchant offering the deal, as well as offer acceptance terms that identify minimum acceptance requirements for accepting a purchase offer bid (e.g., offer acceptance reserve amount and/or minimum offer bid amount). The available deals may be presented by displaying a list of vehicles and their corresponding information that are being offered for sale by merchants. The user may then select one or more of the available vehicles to submit purchase offers in the form of bids. The acceptance terms data may be stored on the memory 143 of the application server 140, or a database in communication with the application server 140 such as database 160.

After selection of one or more vehicles, the bid receiving circuitry 152 may generate a GUI that includes information fields for receiving the user's bid, as well as additional information for processing the user's bid. The bid receiving circuitry 152 may handle a bid received through the GUI according to the type of bid received. Bid types that may implement the pre-populating feature described herein include a proxy bid type and an if bid type.

A proxy bid allows a user of the online marketplace application 150 to input an initial bid and a maximum proxy bid and have the online marketplace application 150 accept the initial bid as long as the initial bid meets minimum offer bid criteria, if they exist, for a deal. The online marketplace application 150 may then automatically re-bid a higher bid amount on behalf of the user when another user inputs a higher bid than the user's current bid. The online marketplace application 150 will continue to automatically re-bid a higher bid at predetermined amount intervals on behalf of the user when another user inputs a higher bid than the user's current bid until the maximum proxy bid is reached. When another user inputs a bid that is higher than the user's maximum proxy bid, the online marketplace application 150 may transmit a message to the user informing the user that the other user has input a bid that is higher than the user's maximum proxy bid. The message may be transmitted via a communication network in the form of an automated voice message, an email, text message, or other type of electronic message to a communication device or electronic message receiving service identified as corresponding to the user.

The pre-population feature may be implemented during a proxy bid feature implementation by pre-populating coupon information in a GUI for submitting the automatic re-bids according to the proxy bid feature scenario.

An if bid may be recognized by the online marketplace application 150 for a deal when the user inputs a bid equal to at least a minimum offer bid amount set by the merchant of the deal, but less than the reserve price to meet a buy now bid for the deal. The if bid may be input by the user at any time during the active period of the deal while the if bid amount is less than the buy now bid for the deal. Recognition of the if bid by the online marketplace application 150 may also enable communication between the user and the merchant of the deal via messages sent through the online marketplace application 150. The online marketplace application 150 may also monitor the if bids submitted by the user and present messages to the user or merchant based on the monitored if bids submitted by the user. For example, when the last if bid submitted by the user is within a predetermined range (either amount or percentage) from the deals reserve or buy it now amount, the online marketplace application 150 may present the user and/or merchant a message describing a coupon corresponding to the deal.

The pre-population feature may be implemented during an if bid feature implementation by pre-populating the coupon information for the deal in a subsequent bid GUI when the online marketplace application 150 recognizes the user is engaged in the if bid feature scenario.

Figure 3:
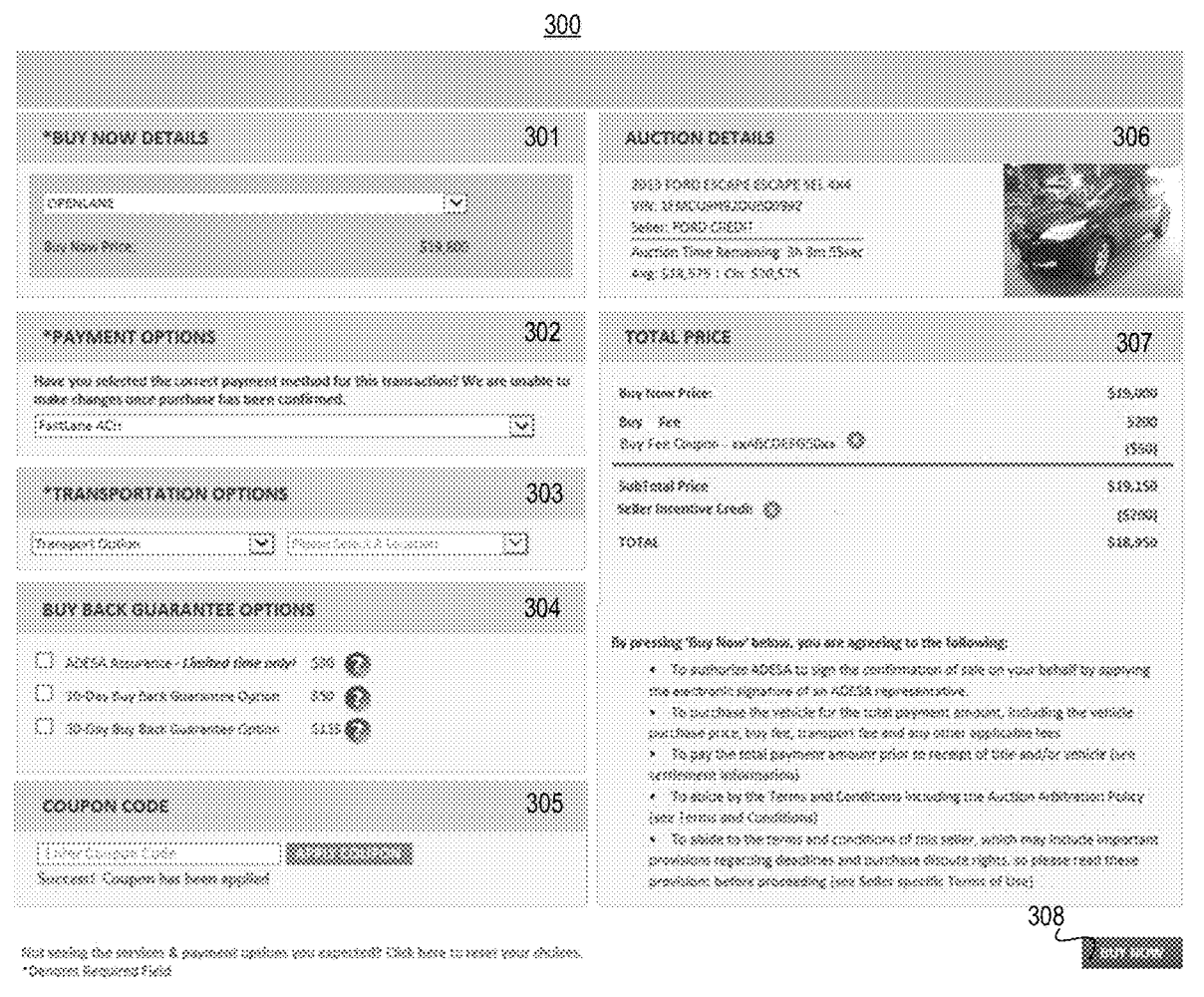

FIG. 3 illustrates an exemplary first bid receiving GUI 300 that the bid receiving circuitry 152 may generate on a user's communication device 110. The web application 115 may control display of the first bid receiving GUI 300 on a display screen of the communication device 110. The first bid receiving GUI 300 includes a plurality of information fields for inputting information corresponding to a buy now type of purchase offer bid. The first bid receiving GUI 300 may include a Buy Now Details section 301 for receiving a buy now purchase offer bid for a vehicle, a Payment Options section 302 for receiving financial information for payment of the vehicle, a Transportation Option 303 for receiving information for shipping the vehicle, a Buy Back Guarantee Option 304 for selecting one or more insurance options, a Coupon Code section 305 for receiving information such as a coupon code for applying to the transaction, an Auction Details section 306 for presenting information on the vehicle, and a Total Price section 307 that includes information of the prices and fees included in the purchase of the vehicle. The Total Price section may include coupon information that describes a benefit corresponding to the coupon associated with the coupon code input in the Coupon Code section 305. The buy now bid may be submitted by selection of the buy now option 308.

The coupon information displayed in the Total Price section 307 may have been obtained by looking up the coupon information from the database 160 based on the received coupon code. For example, the communication device 110 may access the database 160 to look up the coupon information corresponding to the coupon code input into the first bid receiving GUI 300. The communication device 110 may also transmit the coupon code to the application server 140 with a request to the online marketplace application 150 to access the database 160 and retrieve coupon information corresponding to the coupon code. The online marketplace application 150 may then control a process for retrieving the coupon information from the database, and returning the retrieved coupon information back to the communication device 110 and the web application 115 running on the communication device 110. This way, the coupon information may be displayed on the first bid receiving GUI 300. The coupon code itself may be a combination of alphanumeric digits.

As the first bid receiving GUI 300 corresponds to a buy now bid where the user's bid is intended to match a buy now price set by the merchant, there may not be an opportunity for the online marketplace application 150 to pre-populate the coupon information in the Coupon Code section 305 for a subsequent bid based on the deal described by the first bid receiving GUI 300.

Figure 4:
FIG. 4 illustrates another exemplary graphical user interface.

FIG. 4 illustrates an exemplary second bid receiving GUI 400 that the bid receiving circuitry 152 may generate on a user's communication device 110. The second bid receiving GUI 400 may include a Bid Details section 401 for receiving a bid (e.g., proxy bid or if bid) offer on a vehicle offered by a merchant in a deal presented by the second bid receiving GUI 400. The maximum bid amount may correspond to a maximum proxy bid amount or a current bid in a proxy bid feature scenario, as described herein. Alternatively, the maximum bid amount may correspond to a current if bid according to the if bid feature scenario, as described herein.

The second bid receiving GUI 400 also includes a Payment Options section 402 for receiving financial information for payment of the vehicle, a Transportation Option 403 for receiving information for shipping the vehicle, a Buy Back Guarantee Option 404 for selecting one or more insurance options, a Coupon Code section 405 for receiving information such as a coupon code for applying to the deal, an Auction Details section 406 for presenting information on the vehicle, and a Total Price section 407 that includes information of the prices and fees included in the purchase of the vehicle according to the deal. Both the proxy bid feature and the if bid feature allows for pre-population of coupon code information in the Coupon Code section 405, when a subsequent bid is automatically prepared by the online marketplace application 150, as described in further detail herein. A coupon code that is received through the Coupon Code section 405 may be analyzed by the online marketplace application 150 to determine whether the coupon code may be applied to the current deal. For example, the online marketplace application 150 may analyze the coupon corresponding to the coupon code received through the Coupon Code section 405 to determine where the coupon code has expired, whether the coupon code is not currently applicable (e.g., coupon code starts at a future time/date), or if the coupon code may not be applied to the current deal based on criteria of the coupon and/or current deal. When the online marketplace application 150 determines the coupon code is not applicable, the benefits of the corresponding coupon will not be applied in a Total Price section 407. When the online marketplace application 150 determines the coupon code is applicable, the benefits of the corresponding coupon will be applied in the Total Price section 407.

The Total Price section also includes coupon information describing coupons and their corresponding benefits that may be applied to the price and/or fees included in the purchase of the vehicle according to the deal. The coupon information displayed in the Total Price section 407 may have been obtained by looking up the coupon information from the database 160 based on the received coupon code. For example, the Total Price section 407 describes a buy fee coupon in the amount of $137.50 (coupon code GMFBUY-FEE) and an ADESA Assurance Coupon in the amount of $30 (coupon code EBIZ$QTZ). To obtain the coupons associated with the deal described by the second bid receiving GUI 400, communication device 110 may access the database 160 to look up the coupon information corresponding to the coupon code input into the second bid receiving GUI 400. The communication device 110 may also transmit the coupon code to the application server 140 with a request to the online marketplace application 150 to access the database 160 and retrieve coupon information corresponding to the coupon code. The online marketplace application 150 may then control a process for retrieving the coupon information from the database, and returning the retrieved coupon information back to the communication device 110 and the web application 115 running on the communication device 110. This way, the coupon information may be displayed on the second bid receiving GUI 400. The bid may be submitted by selection of the bid option 408.

The user's purchase offer bid for the vehicle may be submitted according to the first bid receiving GUI 300, the second bid receiving GUI 400, or another exemplary bid receiving GUI generated by the bid receiving circuitry 152 that includes one or more of the sections described with reference to first bid receiving GUI 300 and second bid receiving GUI 400. Once submitted, the enhancement data circuitry 153 may determine whether to generate a subsequent bid receiving GUI that includes one or more information fields pre-populated with enhancement data input during the previous bid receiving process based on pre-population criteria. For example, pre-population criteria may provide instructions for the enhancement data circuitry 153 to re-create a bid receiving GUI where the coupon code section is pre-populated with the coupon code input previously in the bid receiving GUI when the enhancement data circuitry 153 determines that the purchase offer bid received by the bid receiving circuitry 152 has not been accepted in view of acceptance requirements associated with the vehicle under either the proxy bid feature or if bid feature scenarios.

The pre-population criteria may also provide instructions for the enhancement data circuitry 153 to re-create a bid receiving GUI where additional sections (e.g., Payment Options section) are pre-populated based at least on the user being confirmed to be a vehicle dealer (e.g., a merchant) by the enhancement data circuitry 153. Among the different classification types of possible users (e.g., public consumer, private/verified consumer, vehicle dealer), the vehicle dealer may benefit from enhanced capabilities within the online marketplace application 150 as the vehicle dealer is generally understood to be a trustworthy user. Thus a user that has been verified as being a vehicle dealer may also benefit from enhanced pre-population features when submitting automatically pre-populated bids. According to other embodiments, the pre-population feature may be available to any user regardless of user classification based on the user enabling the feature and selecting the sections that will be pre-populated.

According to some embodiments, a predetermined subset of available deals may be selected for being enabled with the pre-population feature. For example, the available deals that are pre-selected for inclusion in the subset may be determined based on vehicle information corresponding to the respective available deal. It follows that the pre-population criteria may determine whether to re-create a bid receiving GUI with the coupon code section pre-populated with the coupon code input previously in the bid receiving GUI based on whether the current vehicle deal being bid on satisfies a condition according to the vehicle information. For example, the pre-population criteria may determine that vehicles offered by a certain merchant satisfy the pre-population criteria for being eligible for the pre-population feature. The pre-population criteria may also determine vehicles having certain pre-determined attributes (e.g., vehicle model year, vehicle model) satisfy the pre-population criteria for being eligible for the pre-population feature.

According to some embodiments, pre-population criteria may provide instructions for the enhancement data circuitry 153 to determine whether the coupon corresponding to the coupon code input into the bid receiving GUI is still valid. According to some embodiments, the coupon may only be valid for a predetermined valid time period. Therefore, when the enhancement data circuitry 153 determines that the current time has gone past the coupon's valid time period, the enhancement data circuitry 153 may not include the coupon code into the subsequently generated bid receiving GUI even after determining the purchase offer bid has not been accepted.

According to some embodiments, even when the coupon is determined to have a predetermined valid time period and the current time has gone past the valid time period, pre-population criteria may provide instructions for the enhancement data circuitry 153 to still pre-populate the coupon code section with the coupon code input previously in the bid receiving GUI when the current auction period for the vehicle is ongoing.

Figure 5:
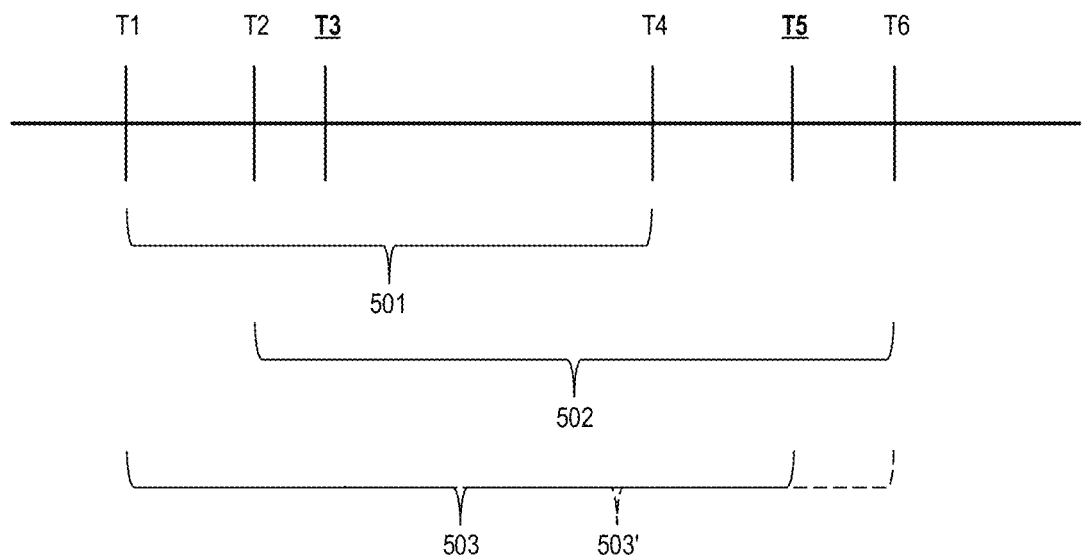
FIG. 5 illustrates an exemplary timeline of events related to the exemplary data retention system.

For example, FIG. 5 shows a timeline 500 that includes a valid time period 501 lasting from T1 to T4 that corresponds to a predetermined time period during which the coupon may be set to be valid. Auction period 502 represents a predetermined time period during which an auction for the vehicle will last on the online marketplace application 150. In timeline 500, time T3 represents a time when the user inputs their first purchase offer bid and the coupon code into a bid receiving GUI. This first purchase offer bid may be analyzed by the enhancement data circuitry 153 and determined at time T5 that the first purchase offer bid does not satisfy the acceptance terms for the vehicle. The enhancement data circuitry 153 may also analyze coupon information corresponding to the coupon code to determine that time T5 is past the valid time period 501 during which the coupon is considered valid. However, the enhancement data circuitry 153 may also determine that the current auction period 502 for the vehicle is still running. Then, because the coupon code was first entered while the coupon code was within the valid time period 501, and the auction period 502 for the vehicle which the first purchase offer bid was submitted is still valid at time T5, the enhancement data circuitry 153 may proceed to generate a subsequent bid receiving GUI with the coupon code pre-populated even though the valid time period has expired. The enhancement data circuitry 153 may continue to generate subsequent bid receiving GUIs for rejected purchase offer bids as long as the auction period for the vehicle remains running. This way, the enhancement data circuitry 153 may extend the valid time period 501 for the coupon code to at least an enhanced valid time period 503 to time T5, which may further extend all the way to time T6 for a final enhanced valid time period 503' that coincides with the end of the auction period 502.

As described, the data retention strategy described herein may be particularly beneficial in cases where the user is participating in an auction type of transaction on the online marketplace where timing of bids is important to secure transactions. Therefore the pre-population of at least the coupon code will save the user time from having to re-enter the coupon code when submitting a subsequent bid for the vehicle when the user's previous bid has been rejected.

Figure 2:
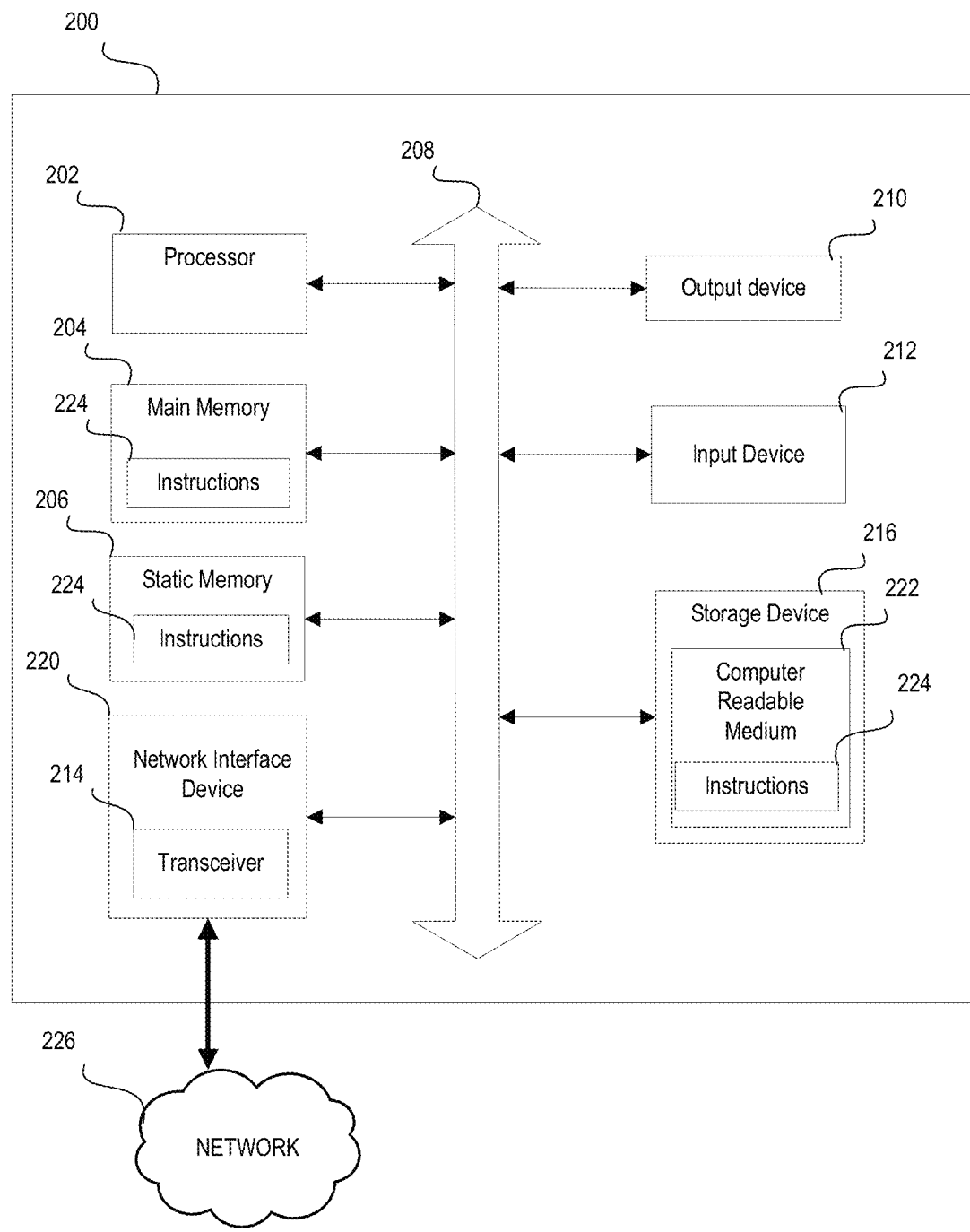
FIG. 2 illustrates a block diagram of exemplary computer architecture for a device in the exemplary data retention system of FIG. 1.

Each of communication device 110, merchant server 120, application server 140, and database 160 may include one or more components of computer system 200 illustrated in FIG. 2.

FIG. 2 illustrates exemplary computer architecture for computer system 200. Computer system 200 includes a network interface 220 that allows communication with other computers via a network 226, where network 226 may be represented by network 130 in FIG. 1. Network 226 may be any suitable network and may support any appropriate protocol suitable for communication to computer system 200. In an embodiment, network 226 may support wireless communications. In another embodiment, network 226 may support hard-wired communications, such as a telephone line or cable. In another embodiment, network 226 may support the Ethernet IEEE (Institute of Electrical and Electronics Engineers) 802.3x specification. In another embodiment, network 226 may be the Internet and may support IP (Internet Protocol). In another embodiment, network 226 may be a LAN or a WAN. In another embodiment, network 226 may be a hotspot service provider network. In another embodiment, network 226 may be an intranet. In another embodiment, network 226 may be a GPRS (General Packet Radio Service) network. In another embodiment, network 226 may be any appropriate cellular data network or cell-based radio network technology. In another embodiment, network 226 may be an IEEE 802.11 wireless network. In still another embodiment, network 226 may be any suitable network or combination of networks. Although one network 226 is shown in FIG. 2, network 226 may be representative of any number of networks (of the same or different types) that may be utilized.

The computer system 200 may also include a processor 202, a main memory 204, a static memory 206, an output device 210 (e.g., a display or speaker), an input device 212, and a storage device 216, communicating via a bus 208.

Processor 202 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. Processor 202 executes instructions 224 stored on one or more of the main memory 204, static memory 206, or storage device 215. Processor 202 may also include portions of the computer system 200 that control the operation of the entire computer system 200. Processor 202 may also represent a controller that organizes data and program storage in memory and transfers data and other information between the various parts of the computer system 200.

Processor 202 is configured to receive input data and/or user commands through input device 212. Input device 212 may be a keyboard, mouse or other pointing device, trackball, scroll, button, touchpad, touch screen, keypad, microphone, speech recognition device, video recognition device, accelerometer, gyroscope, global positioning system (GPS) transceiver, or any other appropriate mechanism for the user to input data to computer system 200 and control operation of computer system 200 and/or operation of the online marketplace application 150. Input device 212 as illustrated in FIG. 2 may be representative of any number and type of input devices.

Processor 202 may also communicate with other computer systems via network 226 to receive instructions 224, where processor 202 may control the storage of such instructions 224 into any one or more of the main memory 204 (e.g., random access memory (RAM)), static memory 206 (e.g., read only memory (ROM)), or the storage device 216. Processor 202 may then read and execute instructions 224 from any one or more of the main memory 204, static memory 206, or storage device 216. The instructions 224 may also be stored onto any one or more of the main memory 204, static memory 206, or storage device 216 through other sources. The instructions 224 may correspond to, for example, instructions that make up the data retention strategy and the online marketplace application 150 or web application 115 illustrated in FIG. 1.

Although computer system 200 is represented in FIG. 2 as a single processor 202 and a single bus 208, the disclosed embodiments applies equally to computer systems that may have multiple processors and to computer systems that may have multiple busses with some or all performing different functions in different ways.

Storage device 216 represents one or more mechanisms for storing data. For example, storage device 216 may include a computer readable medium 222 such as read-only memory (ROM), RAM, non-volatile storage media, optical storage media, flash memory devices, and/or other machine-readable media. In other embodiments, any appropriate type of storage device may be used. Although only one storage device 216 is shown, multiple storage devices and multiple types of storage devices may be present. Further, although computer system 200 is drawn to contain the storage device 216, it may be distributed across other computer systems that are in communication with computer system 200, such as a server in communication with computer system 200. For example, when computer system 200 is representative of communication device 110, storage device 216 may be distributed across to application server 140 when communication device 110 is in communication with application server 140 during operation of the online marketplace application 150 and/or web application 115.

Storage device 216 may include a controller (not shown) and a computer readable medium 222 having instructions 224 capable of being executed by processor 202 to carry out functions of the online marketplace application 150 and/or web application 115. In another embodiment, some or all of the functions are carried out via hardware in lieu of a processor-based system. In one embodiment, the controller included in storage device 216 is a web application browser, but in other embodiments the controller may be a database system, a file system, an electronic mail system, a media manager, an image manager, or may include any other functions capable of accessing data items. Storage device 216 may also contain additional software and data (not shown), for implementing described features.

Output device 210 is configured to present information to the user. For example, output device 210 may be a display such as a liquid crystal display (LCD), a gas or plasma-based flat-panel display, or a traditional cathode-ray tube (CRT) display or other well-known type of display in the art of computer hardware. Accordingly, in some embodiments output device 210 displays a user interface. In other embodiments, output device 210 may be a speaker configured to output audible information to the user. In still other embodiments, any combination of output devices may be represented by the output device 210.

Network interface 220 provides the computer system 200 with connectivity to the network 226 through any compatible communications protocol. Network interface 220 sends and/or receives data from the network 226 via a wireless or wired transceiver 214. Transceiver 214 may be a cellular frequency, radio frequency (RF), infrared (IR) or any of a number of known wireless or wired transmission systems capable of communicating with network 226 or other computer device having some or all of the features of computer system 200. Bus 208 may represent one or more busses, e.g., USB, PCI, ISA (Industry Standard Architecture), X-Bus, EISA (Extended Industry Standard Architecture), or any other appropriate bus and/or bridge (also called a bus controller). Network interface 220 as illustrated in FIG. 2 may be representative of a single network interface card configured to communicate with one or more different data sources.

Computer system 200 may be implemented using any suitable hardware and/or software, such as a personal computer or other electronic computing device. In addition, computer system 200 may also be a portable computer, laptop, tablet or notebook computer, PDA, pocket computer, appliance, telephone, server computer device, or mainframe computer.

Figure 6:
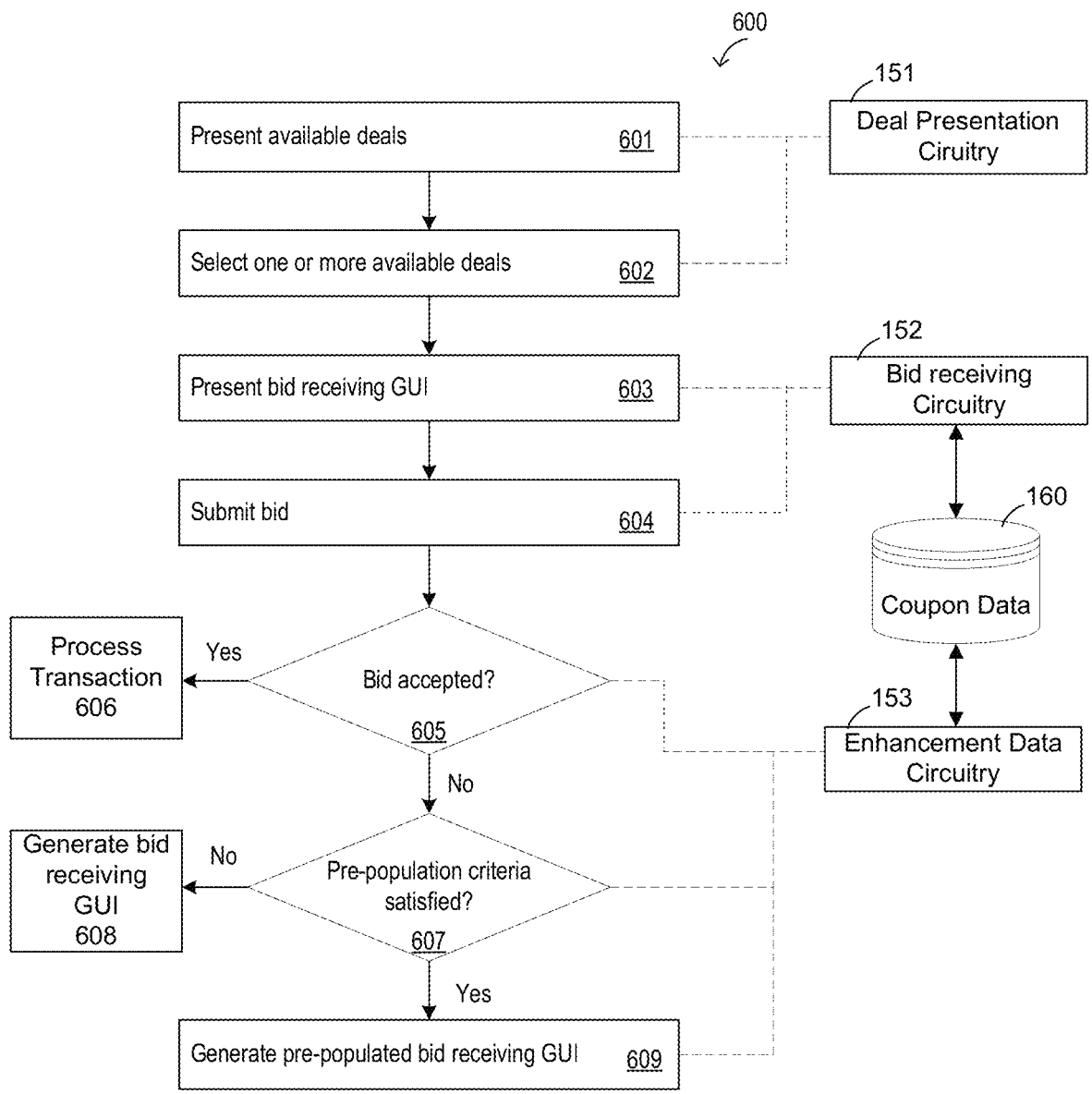
FIG. 6 illustrates an exemplary flow diagram of logic that may be implemented by the exemplary data retention system.

FIG. 6 illustrates an exemplary flow diagram 600 describing components of the online marketplace application 150 operating to implement a data retention strategy. The features described with relation to the flow diagram 600 correspond to the determination of whether to include pre-populated enhancement data (e.g., coupon codes) into a bid receiving GUI following a determination that a previous purchase offer bid has been rejected by the online marketplace application 150. References may be made to components illustrated in FIG. 1 during the description of the flow diagram 600 for exemplary purposes.

The deal presentation circuitry 151 may gather one or more available deals submitted into the online marketplace application 150 and present them to a user (601). The available deals may correspond to vehicles that are for sale in an auction type of transaction according to an exemplary embodiment. The available deals may be presented to the user in a GUI displayed on the user's communication device 115, where the GUI may be controlled by the web application 115 portion of the online marketplace application 150 running on the communication device 110. The available deals may further be selected by the deal presentation circuitry 151 based on user attributes received that correspond to the user currently being presented with the deals. The user attributes may be received based on user login information that relates the user to a user profile describing attributes of the user (e.g., past purchase history, history with the online marketplace application 150, user name, user address, user phone number, or other available user attribute).

The deal presentation circuitry 151 may receive a selection of one or more available deals as provided by the user via selection inputs to the web application 115 running on the communication device 110 (602).

The bid receiving circuitry 152 may present a bid receiving GUI corresponding to the selected deals that include at least one vehicle for sale (603). The bid receiving GUI may include at least a purchase offer bid input field for the vehicle and a coupon code input field. The bid receiving circuitry 152 may receive a purchase offer bid input and a coupon code input as provided by the user's input into the chase offer bid input field and the coupon code input field to the web application 115 running on the communication device 110. The bid receiving circuitry 152 may access coupon information corresponding to the received coupon code from the database 160, and present the coupon information on the bid receiving GUI.

The bid receiving circuitry 152 may receive the purchase offer bid (604).

The enhancement data circuitry 153 may determine whether the purchase offer bid is accepted (605). For example, the enhancement data circuitry 153 may compare the purchase offer bid to acceptance terms corresponding to the vehicle to determine whether the purchase offer bid should be accepted. When the enhancement data circuitry 153 determines the purchase offer bid should be accepted, the online marketplace application 150 may process the transaction for the vehicle according to information input into the bid receiving GUI.

When the enhancement data circuitry 153 determines that the purchase offer bid is rejected, the enhancement data circuitry 153 proceeds to determine whether a pre-population criteria is satisfied (607). For example, the enhancement data circuitry 153 may determine whether the pre-population criteria has been satisfied according to any of the processes described herein. When the enhancement data circuitry 153 determines that the pre-population criteria has not been satisfied, the enhancement data circuitry 153 may generate a subsequent bid receiving GUI that does not include pre-populated information fields, and in particular may not include a pre-populated coupon code field (608).

However, when the enhancement data circuitry 153 determines that the pre-population criteria has been satisfied, the enhancement data circuitry 153 may generate a pre-populated bid receiving GUI (609). For example, the enhancement data circuitry 153 may generate a pre-populated receiving GUI as described herein that includes at least the coupon code input.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

What is claimed is:

1. A system, comprising:
   a database configured to store enhancement data attribute information and deal acceptance information;
   a communication interface configured to receive enhancement data, wherein the enhancement data is a coupon code corresponding to a benefit associated with purchasing a good or a service, the coupon code having an associated expiration; and
   a processor in communication with the database and the communication interface and configured to:
   transmit, through the communication interface, a first bidder graphical user interface (GUI), the first bidder GUI including a bid field for entry of bid information for the good or the service by a user of a mobile device and an enhancement field that is blank for entry of the enhancement data by the user of the mobile device;
   receive, from the mobile device and through the communication interface, the first bidder GUI including the bid field with the bid information corresponding to an offering of a bid from the user of the mobile device and the enhancement field with the enhancement data;

compare the bid information to acceptance information corresponding to the offering;

determine whether the bid included in the bid information is accepted based on the comparison; and in response to determining that the bid information is not accepted:

determine whether a pre-population criteria to pre-populate a second GUI is satisfied by:

determining a time in which the coupon code was entered in the first bidder GUI;

determining whether the time in which the coupon code was entered in the first bidder GUI is past the expiration;

responsive to determining that the time in which the coupon code was entered in the first bidder GUI is past the expiration, determining not to prepopulate the second GUI with the coupon code; and responsive to determining that the time in which the coupon code was entered in the first bidder GUI is not past the expiration, determining that the pre-population criteria to prepopulate the second GUI is satisfied for prepopulating the second GUI with the coupon code;

responsive to determining that the bid information is not accepted and to determining that the pre-population criteria to prepopulate the second GUI is satisfied, generate the second GUI that includes the bid field for entry of bid information for the good or the service by the user of the mobile device and the enhancement field that is pre-populated with the enhancement data;

responsive to determining that the bid information is not accepted and to determining that the pre-population criteria to prepopulate the second GUI is not satisfied, generate the second GUI that includes the bid field for entry of bid information by the user of the mobile device and the enhancement field that is blank for entry of the enhancement data by the user of the mobile device; and send, to the mobile device, the second GUI.

2. The system of claim 1, wherein the coupon code corresponding to the benefit associated with purchasing the good or the service is described by the enhancement data attribute information stored in the database; and wherein the bid information comprises an auction bid for a vehicle.

3. The system of claim 1, wherein the bid information comprises an auction bid for a vehicle with associated vehicle information; and wherein the processor is configured to determine whether the pre-population criteria to prepopulate the second GUI is satisfied based on the vehicle information associated with the vehicle.

4. The system of claim 3, wherein the vehicle information comprises a seller of the vehicle; and wherein the processor is configured to determine whether the pre-population criteria to prepopulate the second GUI is satisfied based on the seller of the vehicle.

5. The system of claim 3, wherein the vehicle information comprises a vehicle model year and a vehicle model; and wherein the processor is configured to determine whether the pre-population criteria to prepopulate the second GUI is satisfied based on at least one of the vehicle model year or the vehicle model.

6. The system of claim 1, wherein at a time to generate the second GUI, the coupon code has expired; and wherein the processor is configured to prepopulate the second GUI with the coupon code that has expired responsive to determining that the time in which the coupon code was entered in the first bidder GUI is not past the expiration.

7. A method for implementing an enhancement data retention strategy, comprising:

transmitting, through a communication interface, a first bidder graphical user interface (GUI), the first bidder GUI including a bid field for entry of bid information for a good or a service by a user of a mobile device and an enhancement field that is blank for entry of enhancement data by the user of the mobile device, wherein the enhancement data is a coupon code corresponding to a benefit associated with purchasing the good or the service, the coupon code having an associated expiration;

receiving, from the mobile device and through the communication interface, the first bidder GUI including the bid field with the bid information corresponding to an offering of a bid from the user of the mobile device and the enhancement field with the enhancement data;

comparing the bid information to acceptance information corresponding to the offering;

determining whether the bid included in the bid information is accepted based on the comparison; and in response to determining that the bid information is not accepted:

determining whether a pre-population criteria to pre-populate a second GUI is satisfied by:

determining a time in which the coupon code was entered in the first bidder GUI;

determining whether the time in which the coupon code was entered in the first bidder GUI is past the expiration;

responsive to determining that the time in which the coupon code was entered in the first bidder GUI is past the expiration, determining not to prepopulate the second GUI with the coupon code; and responsive to determining that the time in which the coupon code was entered in the first bidder GUI is not past the expiration, determining that the pre-population criteria to prepopulate the second GUI is satisfied for prepopulating the second GUI with the coupon code;

responsive to determining that the bid information is not accepted and to determining that the pre-population criteria to prepopulate the second GUI is satisfied, generating the second GUI that includes the bid field for entry of bid information for the good or the service by the user of the mobile device and the enhancement field that is pre-populated with the enhancement data;

responsive to determining that the bid information is not accepted and to determining that the pre-population criteria to prepopulate the second GUI is not satisfied, generating the second GUI that includes the bid field for entry of bid information by the user of the mobile device and the enhancement field that is blank for entry of the enhancement data by the user of the mobile device; and sending, to the mobile device, the second GUI.

8. The method of claim 7, wherein the coupon code corresponding to the benefit is described by enhancement data attribute information stored in a database.

9. The method of claim 8, wherein the benefit provides at least one of a discount on a deal or a discount on a fee corresponding to the offering.

10. The method of claim 7, wherein the bid information comprises an auction bid for a vehicle with associated vehicle information; and
wherein determining whether the pre-population criteria to prepopulate the second GUI is satisfied is based on the vehicle information associated with the vehicle.

11. The method of claim 10, wherein the vehicle information comprises a seller of the vehicle; and
wherein determining whether the pre-population criteria to prepopulate the second GUI is satisfied is based on the seller of the vehicle.

12. The method of claim 10, wherein the vehicle information comprises a vehicle model year and a vehicle model; and
wherein determining whether the pre-population criteria to prepopulate the second GUI is satisfied is based on at least one of the vehicle model year or the vehicle model.

13. The method of claim 7, wherein at a time to generate the second GUI, the coupon code has expired; and
wherein the second GUI is prepopulated with the coupon code that has expired responsive to determining that the time in which the coupon code was entered in the first bidder GUI is not past the expiration.

14. A communication device comprising:
a communication interface configured to receive enhancement data, wherein the enhancement data is a coupon code corresponding to a benefit associated with purchasing a good or a service, the coupon code having an associated expiration; and
a processor configured to:
communicate with a database storing enhancement data attribute information and deal acceptance information;
transmit, through the communication interface, a first bidder graphical user interface (GUI), the first bidder GUI including a bid field for entry of bid information for the good or the service by a user of a mobile device and an enhancement field that is blank for entry of the enhancement data by the user of the mobile device;
receive, from the mobile device and through the communication interface, the first bidder GUI including the bid field with the bid information corresponding to an offering of a bid from the user of the mobile device and the enhancement field with the enhancement data;
compare the bid information to acceptance information corresponding to the offering;
determine whether the bid included in the bid information is accepted based on the comparison; and
in response to determining that the bid information is not accepted:
determine whether a pre-population criteria to prepopulate a second GUI is satisfied by:
determining a time in which the coupon code was entered in the first bidder GUI;
determining whether the time in which the coupon code was entered in the first bidder GUI is past the expiration;
responsive to determining that the time in which the coupon code was entered in the first bidder GUI is past the expiration, determining not to prepopulate the second GUI with the coupon code; and
responsive to determining that the time in which the coupon code was entered in the first bidder GUI is not past the expiration, determining that the pre-population criteria to prepopulate the second GUI is satisfied for prepopulating the second GUI with the coupon code;
responsive to determining that the bid information is not accepted and to determining that the pre-population criteria to prepopulate the second GUI is satisfied, generate the second GUI that includes the bid field for entry of bid information for the good or the service by the user of the mobile device and the enhancement field that is prepopulated with the enhancement data;
responsive to determining that the bid information is not accepted and to determining that the pre-population criteria to prepopulate the second GUI is not satisfied, generate the second GUI that includes the bid field for entry of bid information by the user of the mobile device and the enhancement field that is blank for entry of the enhancement data by the user of the mobile device; and
send, to the mobile device, the second GUI.

15. The communication device of claim 14, wherein the bid information comprises an auction bid for a vehicle with associated vehicle information; and
wherein the processor is configured to determine whether the pre-population criteria to prepopulate the second GUI is satisfied based on the vehicle information associated with the vehicle.

16. The communication device of claim 15, wherein the vehicle information comprises a seller of the vehicle; and
wherein the processor is configured to determine whether the pre-population criteria to prepopulate the second GUI is satisfied based on the seller of the vehicle.

* * * * *